United States Patent

Bonné et al.

[11] Patent Number: 5,295,722
[45] Date of Patent: Mar. 22, 1994

[54] RETRACTABLE FOLDING TOP FOR MOTOR VEHICLES

[75] Inventors: Andreas Bonné, Lindau; Martin Guckel, Wiernsheim; Jürgen Schrader, Weil im Schönbuch; Klaus Claar, Gechingen, all of Fed. Rep. of Germany

[73] Assignee: Mercedes-Benz AG, Fed. Rep. of Germany

[21] Appl. No.: 899,847

[22] Filed: Jun. 17, 1992

[30] Foreign Application Priority Data

Jun. 21, 1991 [DE] Fed. Rep. of Germany ....... 4120474

[51] Int. Cl.⁵ .................................................. B60J 7/08
[52] U.S. Cl. ....................................... 296/121; 296/107
[58] Field of Search ...................... 296/121, 107, 116

[56] References Cited

U.S. PATENT DOCUMENTS

| | | | |
|---|---|---|---|
| 2,747,928 | 5/1956 | Olivier et al. | 296/107 |
| 4,611,849 | 9/1986 | Trenkler | 296/121 X |
| 4,746,163 | 5/1988 | Muscat | 296/120 |
| 4,778,215 | 10/1988 | Ramaciotti | 296/121 X |
| 5,004,291 | 4/1991 | Bauer et al. | 296/121 X |
| 5,035,461 | 7/1991 | Zweigart | 296/107 |
| 5,067,768 | 11/1991 | Fischbach | 296/107 |

FOREIGN PATENT DOCUMENTS 0425156 2/1991 European Pat. Off. .
948121 8/1956 Fed. Rep. of Germany .

Primary Examiner—Joseph D. Pape
Attorney, Agent, or Firm—Evenson, McKeown, Edwards & Lenahan

[57] ABSTRACT

A retractable folding top for motor vehicles, having a top frame which comprises a material retaining hoop forming the lower termination of the top, and a top storage box for accommodating the folded top. The top storage box can be closed by a top storage box lid, following which it is held shut by a closure. The top has a position of rest of the material retaining hoop on the top storage box lid when the top is closed, in which the material retaining hoop is noncontinuously connected to the top storage box lid via a closure arrangement. To simplify operation, the closure arrangement between the material retaining hoop and the top storage box lid has only a single closure which is arranged in the central region of the overlap zone between the top storage box lid and the material retaining hoop.

9 Claims, 3 Drawing Sheets

RETRACTABLE FOLDING TOP FOR MOTOR VEHICLES

BACKGROUND AND SUMMARY OF THE INVENTION

The present invention relates to a retractable folding top for motor vehicles, having a top frame which comprises a material retaining hoop forming the lower termination of the top and has a top storage box lid for accommodating the folded top. The top storage box can be closed by a top storage box lid, following which it is held shut by closure means. The folding top has a position of rest of the material retaining hoop on the top storage box lid when the top is closed. The material retaining hoop is non-continuously connected to the top storage box lid via a closure arrangement.

Such a folding top is already known from German Patent Document 948,121, in which two closures are provided on the top storage box lid to hold down the material retaining hoop. The closure hooks of these closures, arranged on the material retaining hoop, each engages behind an associated retaining plate of the top storage box lid. Since the closure hooks are articulated on the material retaining hoop by means of gripping levers, the closures can be locked and unlocked by directionally adjusted pivoting of their gripping levers.

Because of the functional principle of these hook closures, manual actuation of the known folding top is relatively inconvenient, since both gripping levers have to be operated both during opening and during closing of the top.

Increasingly, therefore, twist-type spring locks are being used for locking frame components of folding tops which are conventional today. The twist-type spring locks lock automatically as a result of the pressing-down of the frame component onto the associated connecting component, with the forked latch of the twist-type spring locks being rotated by the closure pin, which impacts on it, into its closed position in which it is retained by a spring-loaded safety catch.

If, then, the two hook closures of the previously known folding top were to be replaced by corresponding twist-type spring locks of a conventional type, a two-point locking, and hence simplification of operation, would in principle be possible by absolutely uniform pressing-down of the material retaining hoop onto the top storage box lid. However, the center of the material retaining hoop is accessible only with difficulty from the vehicle side, as a result of which laterally offset pressing-down of the material retaining hoop is induced.

With laterally offset pressing-down of the material retaining hoop, the material retaining hoop may twist somewhat, as a result of which only the twist-type spring lock disposed on the operating side enters into its locking position. If, in this case, the closure pin on the opposite side is not wedged, and so locked, in the associated closure housing, the material retaining hoop can now be brought into its definitively locked position of rest on the top storage box lid by pressing down on the side which is still open. Since this requires the operator to move to the other side of the vehicle, operation of the folding top remains relatively inconvenient despite the twist-type spring locks.

An object of the present invention is to provide a folding top in which the operation of the folding top is significantly simplified in the locking of the material retaining hoop on the top storage box lid.

This and other objects are achieved by the present invention which provides a retractable folding top for motor vehicles which has a top frame having a material retaining hoop forming a lower termination of the top, a top storage box for accommodating the folded top, a top storage box lid for closing the top storage box, a closure for holding shut the top storage box lid, the top having a position of rest of the material retaining hoop on the top storage box lid when the top is closed, and a closure by which the material retaining hoop is non-continuously connected to the top storage box lid. The closure arrangement between the material retaining hoop and the top storage box lid has only a single, first closure which is arranged in a central region of an overlap zone between the top storage box lid and the material retaining hoop.

The locking of the material retaining hoop from one side of the vehicle is comfortably possible as a result of the omission of additional closures. The nonduplication of the closure arrangement simultaneously results in a significant cost advantage, since closures, being precision components, require a significant production engineering effort and are hence expensive.

On the other hand, single-point locking of the material retaining hoop on the associated top storage box lid is not without its problems, since when the folding top is closed, the tensile forces in the top cover must be transmitted to a single point on the top storage box lid and absorbed thereby. The top storage box lids of conventional antibuckling rigidity are not readily able to withstand this stress.

When the top storage box lid is fitted counter to the material retaining hoop, the closure for holding down the material retaining hoop is advantageously arranged behind the point at which the top storage box lid is secured to the bodywork, as a result of which bending of the top storage box lid on the lock side is prevented. However, the material retaining hoop will overlap the top storage box lid closer to the hinge side, as a result of which the closure for the material retaining hoop will be at a distance, in the longitudinal direction of the vehicle, from the point at which the top storage box lid is locked to the bodywork.

In order that the top storage box lid does not bulge under the influence of the tensile forces of the top cover, partial reinforcement of the top storage box lid is provided in the region in which the closure is arranged, and this holds down the material retaining hoop.

To permit a reinforcement of the top storage box lid which is particularly favorable in terms of weight, a bearing connection which is effective when the top storage box lid is closed is provided between the reinforcement zone of the top storage box lid and the adjoining bodywork, and prevents upward bulging of the reinforcement zone.

Advantageously, the bearing connection comprises a support lever which is attached to the top storage box lid and is moved therewith, and a counter-bearing arranged on the bodywork side, behind which, when the top storage box lid is closed, the supporting lever engages in a force-absorbing manner.

So that the supporting lever should take up only a small amount of space in the top storage box lid, an embodiment of the invention provides as the supporting lever a hoop curved in the manner of a hinged lever, which is guided in the counter-bearing, passing through the counter-bearing.

In order to prevent the end region of the supporting lever which passes through the counter-bearing from producing unpleasant noises in the course of its advance, the end region can interact with a pin of the counter-bearing, the rotatably mounted pin being caused, as a consequence of the advance of the end region resting on its periphery, to execute a corresponding rotation in rolling contact.

The reinforcement zone can, in addition to its static stress during driving operation, also be dynamically stressed as a consequence of the slipstream passing over the top, which is alternately associated with the upward bulging of the reinforcement zone and with the downward bulging of this reinforcement zone.

So that the buckling stress on the reinforcement zone in both directions can be absorbed by the supporting lever, a claw-type connection of the end region in the counter-bearing is provided in an embodiment of the invention.

For the claw-type connection, wedge-shaped surfaces which impact one upon the other on the long side of the end region opposite the engaging side are provided in certain embodiments.

To enable tolerances in the unfinished structure of the vehicle to be compensated, in an embodiment of the invention, the counter-bearing is arranged on a vertically adjustable holder, and an element of the counter-bearing is provided with a wedge-shaped surface adjustably mounted on the holder.

The adjustable element with a wedge-shaped surface preferably comprises a plastics wedge, since the impact noises of the wedge-shaped surface on the end region of the supporting lever are attenuated thereby.

Other objects, advantages and novel features of the present invention will become apparent from the following detailed description of the invention when considered in conjunction with the accompanying drawings.

DETAILED DESCRIPTION OF THE DRAWINGS

Figure 1:
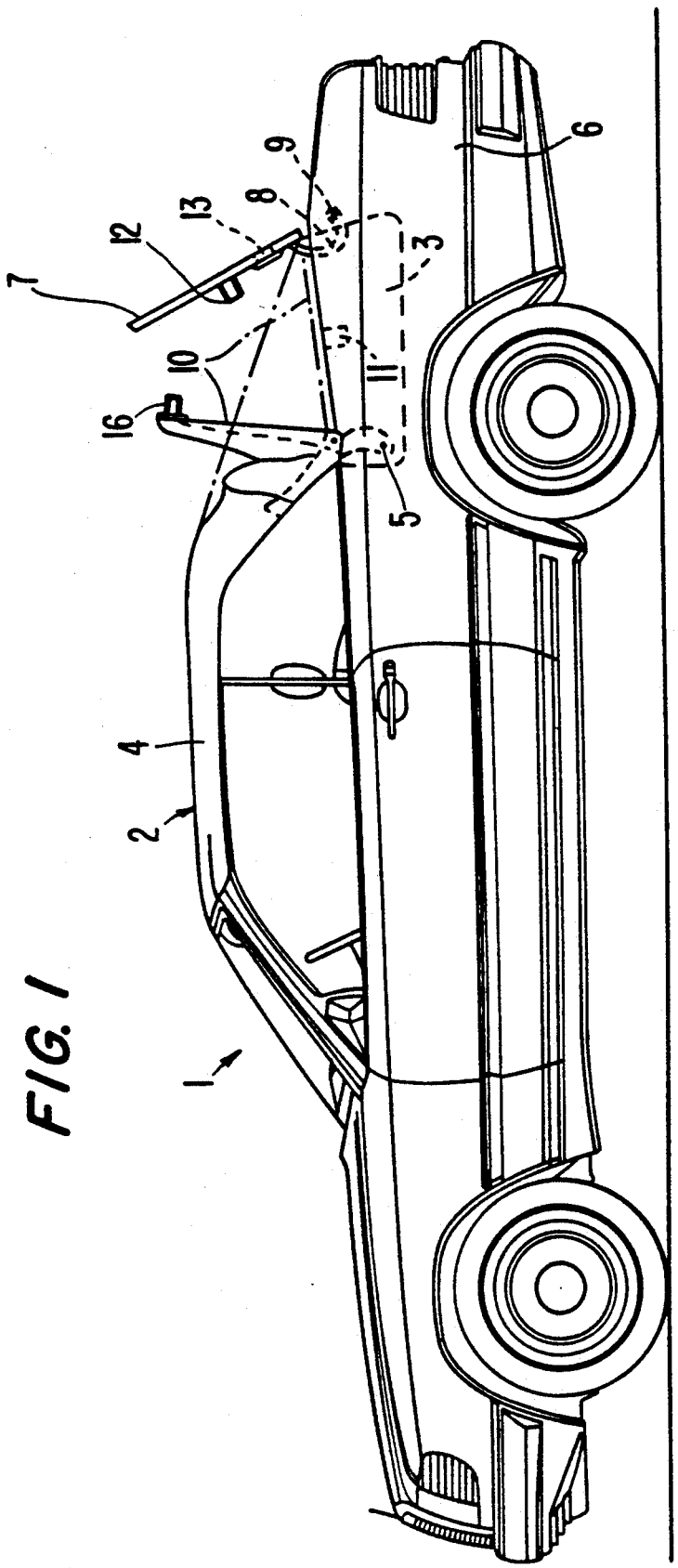
FIG. 1 is a lateral view of a convertible car constructed in accordance with an embodiment of the present invention with the top storage box lid open.

FIG. 1 shows a convertible car 1 having a folding top 2 which can be retracted into a top storage box 3 lying behind the passenger compartment. To this end, the top frame, over which a top cover 4 is stretched and which is therefore largely invisible, can be pivoted backwards about a main pivot 5. This main pivot 5 extends as a horizontal pivot, transverse to the vehicle, in the end region of the lateral legs of the top storage box 3, which is U-shaped in plan view. When the folding top 2 is swung back about the main pivot 5, to which the lateral top pillars of the folding top 2 are attached on the bodywork side, the lateral frame parts of the top frame are folded one upon the other in the lateral legs of the top storage box 3. The frame parts stretched over the width of the roof are folded one upon the other in the central region of the top storage box 3, following which the folding top 2 is completely retracted in the top storage box 3.

Behind the top storage box 3, recessed into the bodywork 6 of the convertible car 1, a top storage box lid 7 is attached to the bodywork 6 and is of forked design, adapted to the U-shaped insertion aperture of the top storage box 3. The function of a pivot stop is served by two hinged levers 8, each of which is arranged on one side of the top storage box lid 7 and articulated thereon by its rear end via a pivot pin 9, as a result of which the top storage box lid 7 can be swung about a horizontal pivot, transverse to the vehicle, in the opposite direction to the folding top 2.

The lower closing section of the folding top 2 is formed by a material retaining hoop 10 which is U-shaped over its length and to the periphery of which the top cover 4 is fixed. This material retaining hoop 10 is articulated by the front ends of its lateral legs on the top pillars of the folding top 2 and can therefore be swung about a pivot parallel to the main pivot 5.

When the folding top 2 is closed, the material retaining hoop 10 is swung into an approximately horizontal position of rest on the closed top storage box lid 7 and is held down on the top storage box lid 7, with close connection to the top thereof, the top storage box lid 7 for its part being held shut by closure means.

Figure 2:
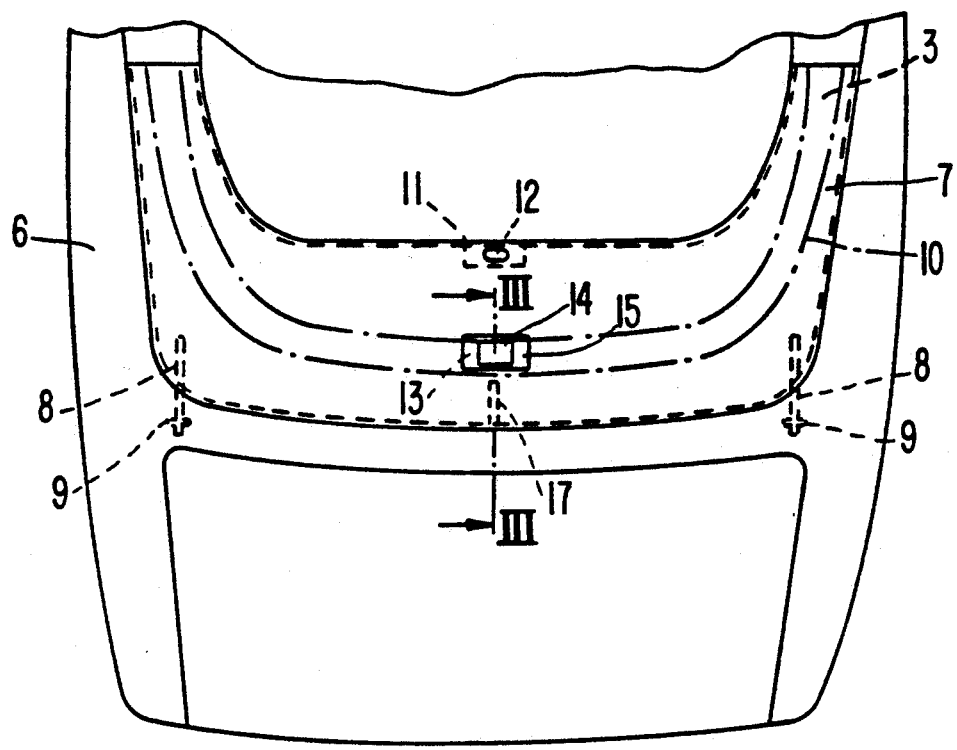
FIG. 2 is a diagrammatic plan view of the closed top box of the convertible car of FIG. 1.

As can be recognized in connection with FIG. 2, a single twist-type spring lock 11 serves to hold the top storage box lid 7 shut. This lock 11 is fixed to the front limiting wall of the top storage box 3 in the middle of the width of the convertible car 1, and is thus arranged centrally between the two hinged levers 8. The twist-type spring lock 11 has, in a conventional construction, a forked latch which can be locked in its closed position by means of a spring-loaded safety catch, and is retained by spring loading in its released position. When the top storage box lid 7 is closed, a closure pin 12 impacts on the fork of the forked latch, this pin projecting from the underside of the top storage box lid 7. As a result, the forked latch is twisted about its axis, extending in the longitudinal direction of the vehicle, into its locked closed position, following which the top storage box lid 7 is reliably locked to the bodywork 6 and bears on a limiting edge of the top storage box 3, with a close connection. For unlocking, the twist-type spring lock 11 can be released by means of a handle or the like.

At a distance behind the closure pin 12, a further twist-type spring lock 13 of the same construction is fitted on the underside of the top storage box lid 7, its entry aperture 14 passing through the top storage box lid 7 and being framed by a disc-shaped trim 15 which is inset into the top of the top storage box lid 7. This twist-type spring lock 13 forms, when the folding top 2 is closed, the single point at which the material retaining hoop 10 is locked onto the top storage box lid 7. It is therefore attached in the middle of the width of the top storage box lid 7, as a result of which, as indicated by broken lines, the spring lock 13 is overlapped by the central region of the material retaining hoop 10, resting on the top storage box lid 7. Opposite to the entry aperture 14 of the twist-type spring lock 13, a closure pin 16 projects from the underside of the material retaining hoop 10 (FIG. 1) and, when the material retaining hoop 10 is swung down onto the top storage box lid 7, interacts with the forked latch of the twist-type spring lock 13 in a locking manner.

When the material retaining hoop 10 is locked on the top storage box lid 7, the top cover 4 is tightly stretched, as a result of which the tensile forces acting in the longitudinal direction of the vehicle are necessarily absorbed by the twist-type spring lock 13, via the closure pin 16.

In order that no buckling distortion of the top storage box lid 7 should arise as a result of these tensile forces exerted by the top cover 4 when the folding top 2 is closed, the top storage box lid 7 is reinforced by means of a supporting device in the region in which the twist-type spring lock 13 is arranged.

Figure 3:
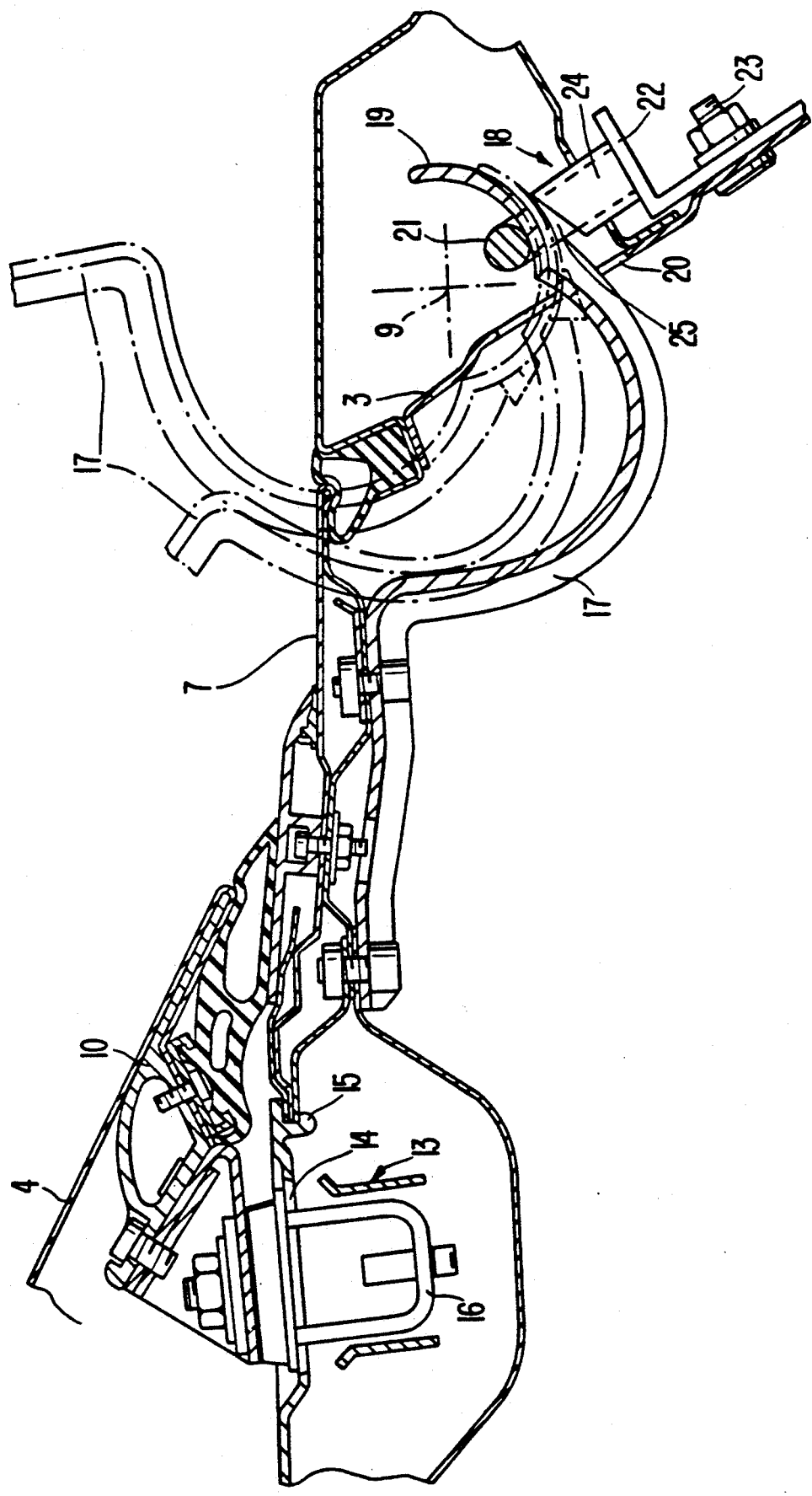
FIG. 3 is a medium longitudinal section through the top storage box lid with the top closed.

This supporting device, which is clearly identifiable in association with the sectional view in FIG. 3, comprises a supporting lever 17 connected to the top storage box lid 7 and a counter-bearing 18 attached to the central rear part of the bodywork 6 and interacting with the supporting lever 17. The supporting lever 17 consists of a flexurally rigid hollow profile which extends along the median longitudinal axis of the convertible car 1, beginning directly behind the region in which the closure 13 is arranged and ending only behind the top storage box 3. In the region in which it overlaps with the top storage box lid 7, the supporting lever 17 rests on the underside thereof and, in this region of its length, is screwed to the inside plate of the double-shelled top storage box lid 7. Close to the rear edge of the top storage box lid 7, the supporting lever 17 is bent downwards at right angles and thereafter makes a transition first into a central region with an approximately semicircular curvature and then into an end region 19. As a result, the integral supporting lever 17 as a whole is of similar design to one of the two hinged levers 8 and, like these, passes through an assigned cut-out 20 in the rear limiting wall of the top storage box 3.

When the top storage box lid 7 is closed, the entire length of the end region 19 lies behind the rear limiting wall of the top storage box 3, passing transversely through a passage aperture in the counter-bearing 18. This passage aperture is limited at the sides and top by a U-shaped hoop 21 whose hoop legs have a constant circular cross-section. The ends of its two lateral legs are immovably connected to the upper wide side of a support plate of a holder 22, the support plate being bent downwards at right angles in front of the hoop 21 and the downward bent plate leg lying flat on and being screwed to the rear side of the rear limiting wall of the top storage box 3. This screw connection is performed by two bolts 23, each of which passes through an assigned hole in the limiting wall and a slot in the plate leg of the holder 22. Since the slots extend parallel to each other in the vertical direction of the plate leg, the holder 22 and hence the counter-bearing 18 are vertically adjustable over the adjustment region of the slot adjustment. As a result, the counter-bearing 18 can be positioned precisely so that the end region 19 engages behind or below the central leg of the hoop 21 without play when the top storage box lid 7 is closed, as a result of which lever forces exerted on the supporting lever 17 are supported by the counter-bearing 18 and so 5 distributed to supporting parts of the bodywork 6.

If the flexural rigidity of the supporting lever 17 is adequate, a reinforcement zone of the top storage box lid 7, lying behind the twist-type spring lock 13, is reliably reinforced thereby against upward bulging, as a result of which the zone in which the twist-type spring lock 13 is arranged is likewise reinforced.

In order that the end region 19 should not engage behind the counter-bearing 18 in a force-absorbing manner until the top storage box lid 7 is swung shut, and does so without impeding the pivoting mobility during the swinging movement, the top of the end region 19 extends, in the longitudinal direction, under an arcuate curvature whose radius is slightly greater than the spacing of the axis of rotation of the bolts 9. As is indicated by broken lines, the engagement behind the counter-bearing 18 is thus retained during the upward pivoting of the top storage box lid 7, but the end region 19 no longer rests on the periphery of the central leg of the hoop 21, but moves without contact, in its longitudinal direction, through the open cross-section of the hoop 21.

In order to ensure that the reinforcement zone is also supported against downward bulging via the supporting lever 17 when the top storage box lid 7 is closed, the end region 19 enters into a claw-type connection with the counter-bearing 18 when the top storage box lid 7 is closed. To this end, a plastic wedge 24 is fixed between the lateral legs of the hoop 21, its upward-facing wedge-shaped surface lying opposite and at a distance from the central leg of the hoop 21. The passage cross-section of the hoop 21 tapers from front to rear as a result of the wedge-shaped surface. When the top storage box lid 7 is shut, a parallel wedge-shaped surface, which is arranged on the underside of the end region 19, impacts on the wedge-shaped surface of the plastics wedge 24. In the illustrated embodiment, a steel wedge 25 with an appropriate wedge angle is welded onto the underside of the end region 19. So that a flat impact of the corresponding wedge-shaped surfaces of the steel wedge 25 and the plastics wedge 24 is ensured, the plastic wedge 24 is designed to be adjustable in the direction of advance of the end region 19, to which end the plastic wedge 24 is adjustable by means of a slot adjustment. For the slot adjustment, lateral feet of the plastic wedge 24 can be provided with a corresponding slot through which the plastic wedge 24 is screwed to the support plate of the holder 22.

Figure 4:
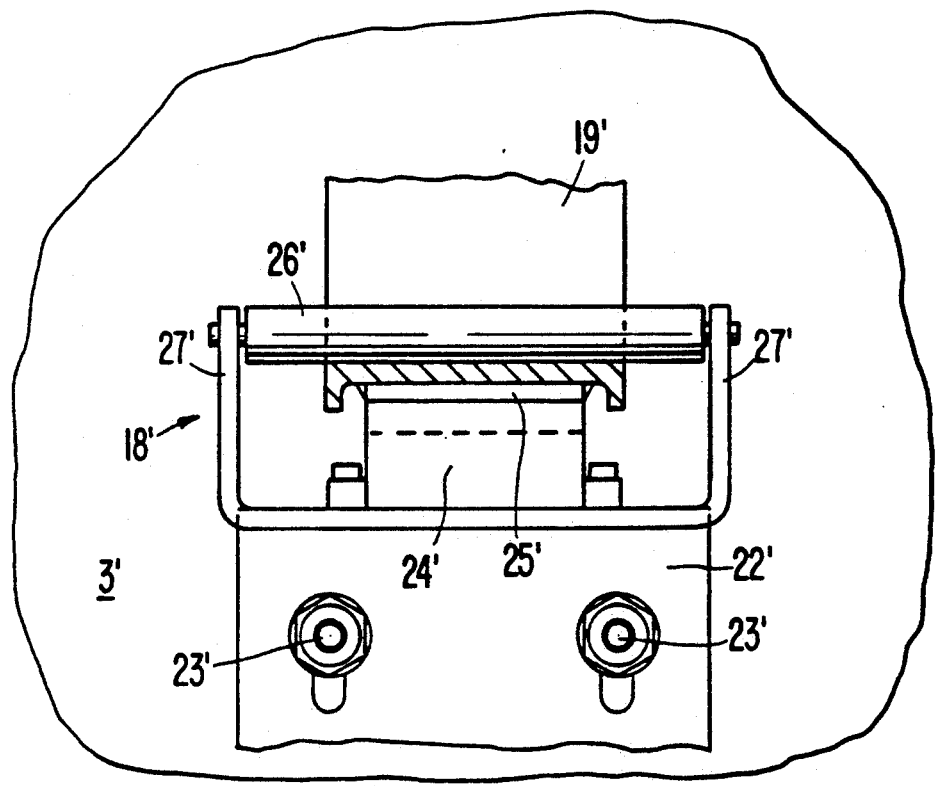
FIG. 4 is a view of a counter-bearing from the rear.

FIG. 4 shows an alternative embodiment of the counter-bearing 18, which represents an improvement on the counter-bearing 18 in terms of function and production engineering. To simplify the description, only the differences are explained in the text which follows, and functionally identical components are provided with the same reference numerals as the counter-bearing 18, the alternative embodiment being identified by a prime sign.

Instead of a hoop, the counter-bearing 18' has a rotatably mounted pin 26', behind whose periphery the end region 19' of the supporting lever 17 engages. The pin 26' is mounted at both ends in a bracket plate 27 and is thus rotatable about an axis which corresponds to its median longitudinal axis. To this end, for the purposes of stable rotational mounting, two short journals of the pin 26' engage into associated mounting holes in the associated bracket plate 27'. It is understood that the pin 26' could also, alternatively, be designed as a cylindrical sleeve through which a bearing bolt would be passed over the entire length thereof.

The two bracket plates 27' comprise lateral widenings of the support plate of the holder 22 which are bent at right angles to the plane of the support plate.

In this embodiment, the end region 19' may have a curvature in its longitudinal direction which exactly corresponds to the distance between its upper side and the axis of the pivot bolts 9, as a result of which its upper side bears on the periphery of the pin 26' in every pivoting position of the top storage box lid 7. Impediment of the pivot movement of the top storage box lid 7 is thereby largely avoided, since the pin 26' rotates and thus moves in rolling contact along the upper side of the end region 19'.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Retractable folding top for motor vehicles comprising:
    a top frame having a material retaining hoop forming a lower termination of the folding top;
    a top storage box for accommodating the folded top;
    a top storage box lid for closing the top storage box;
    a closure device coupled to the top storage box lid for holding shut the top storage box lid, the top having a position of rest of the material retaining hoop on the top storage box lid when the folding top is closed; and
    a closure arrangement by which the material retaining hoop is connected to the top storage box lid, wherein the closure arrangement between the material retaining hoop and the top storage box lid has only a single, first closure which is arranged in a central region of an overlap zone between the top storage box lid and the material retaining hoop.

2. The retractable folding top of claim 1, wherein the motor vehicle has bodywork and the hinged levers arranged laterally on the bodywork, the top storage box lid being pivotably fixed to the bodywork of the vehicle via said hinged levers as a result of which the top storage box lid is swingable about a horizontal pivot, transverse to the vehicle;
    wherein the closure device comprises as second closure on a lock side opposite to a hinge side of the top storage box lid, this second closure being arranged along a longitudinal line spaced equidistant between the hinged levers, and that the first closure lies between the top storage box lid and the material retaining hoop, at a distance behind the point at which the top storage box lid is locked to the bodywork.

3. The retractable folding top of claim 1, wherein the top storage box lid is partially reinforced in the region in which the first closure is arranged in order to mount the material retaining hoop.

4. The retractable folding top of claim 3, wherein, for the purpose of reinforcing the top storage box lid, a supporting device is provided which, when the top storage box lid is closed, maintains a bearing connection between the reinforcing region of the hood box lid and the bodywork.

5. The retractable folding top of claim 4, wherein the supporting device has a supporting lever connected to the top storage box lid which, when the top storage box lid is swung shut, engages behind a counter-bearing on the bodywork side in a force-absorbing manner.

6. The retractable folding top of claim 5, wherein the supporting lever is a hoop curved as a hinged lever with an end region facing away from the top storage box lid and guided in a longitudinally displaceable manner in the counter-bearing through which it passes, and engaging behind the counter-bearing.

7. The retractable folding top of claim 6, wherein the counter-bearing has a rotatably mounted pin with a peripheral surface, and the end region engages behind the peripheral surface of the rotatably mounted pin.

8. The retractable folding top of claim 6, wherein, in order to support the end region in the counter-bearing in a manner resistant to tensile and compressive stresses, a claw-type connection is provided, said claw-type connection comprising a wedge-shaped surface of the end region that interacts, when the hood box lid is closed, with a wedge-shaped surface of the counter-bearing.

9. The retractable folding top of claim 8, further comprising a vertically adjustable holder on which the counter-bearing is arranged, and an element for carrying the wedge-shaped surface and which is adjustable relative to the holder.

* * * * *